(12) United States Patent
Li et al.

(10) Patent No.: US 10,277,450 B2
(45) Date of Patent: Apr. 30, 2019

(54) CIRCUIT, METHOD, AND RECEIVER APPARATUS FOR PERFORMING ON-THE-FLY IQ MISMATCH COMPENSATION

(71) Applicant: MEDIATEK INC., Hsin-Chu (TW)

(72) Inventors: Wei-Chiang Li, Yunlin County (TW); Chen-Jui Hsu, Hsinchi County (TW); Chun-Hsien Peng, Nantou County (TW)

(73) Assignee: MEDIATEK INC., Hsin-Chu (TW)

(*) Notice: Subject to any disclaimer, the term of this patent is extended or adjusted under 35 U.S.C. 154(b) by 0 days.

(21) Appl. No.: 15/716,527

(22) Filed: Sep. 27, 2017

(65) Prior Publication Data
US 2018/0241606 A1    Aug. 23, 2018

Related U.S. Application Data

(60) Provisional application No. 62/462,406, filed on Feb. 23, 2017.

(51) Int. Cl.
| | |
|---|---|
| H04B 1/30 | (2006.01) |
| H04B 15/00 | (2006.01) |
| H04L 27/26 | (2006.01) |
| H04L 27/38 | (2006.01) |

(52) U.S. Cl.
CPC .......... *H04L 27/3863* (2013.01); *H04B 1/30* (2013.01); *H04B 15/005* (2013.01); *H04L 27/265* (2013.01)

(58) Field of Classification Search
CPC ...... H04B 15/00; H04B 15/005; H04B 15/02; H04L 27/265; H04L 27/3863; H04L 27/3872
USPC ............... 375/260–267, 316, 320, 343, 346; 370/208, 210; 455/501, 63.1, 67.13
See application file for complete search history.

(56) References Cited

U.S. PATENT DOCUMENTS

| | | | |
|---|---|---|---|
| 7,672,656 B2 | 3/2010 | Husted | |
| 8,218,687 B2 | 7/2012 | Sayers | |
| 8,331,506 B2 | 12/2012 | Park | |
| 9,118,535 B2 | 8/2015 | Narasimhan | |

(Continued)

OTHER PUBLICATIONS

Lauri Anttila; Mikko Valkama; Markku Renfors, Circularity-Based I/Q Imbalance Compensation in Wideband Direct-Conversion Receivers, Jul. 15, 2008, pp. 2099-2113, vol. 57 Issue: 4, IEEE.

(Continued)

*Primary Examiner* — Young T Tse
(74) *Attorney, Agent, or Firm* — Winston Hsu (57) ABSTRACT

A method employed by a circuit included within a receiver apparatus and configured for performing IQ mismatch compensation when receiver apparatus is operating under data reception mode includes: transforming a data signal, which is generated by a radio frequency receiver under the data reception mode, from time domain into a plurality of frequency bin signals in frequency domain; calculating to obtain at least one frequency domain calibration parameter according to the plurality of frequency bin signals in frequency domain; and, updating at least one coefficient parameter of IQ mismatch compensation according to the obtained at least one frequency domain calibration parameter, to make IQ mismatch compensation compensate IQ mismatch based on the updated at least one coefficient parameter.

20 Claims, 5 Drawing Sheets

(56) References Cited

U.S. PATENT DOCUMENTS

| | | | |
|---|---|---|---|
| 9,344,302 B2* | 5/2016 | Dhayni | H04L 27/364 |
| 2007/0206687 A1* | 9/2007 | Ananth | H04L 25/0232 |
| | | | 375/260 |
| 2008/0159442 A1* | 7/2008 | Tanabe | H04L 27/3863 |
| | | | 375/324 |
| 2008/0279221 A1 | 11/2008 | Wen | |
| 2011/0013724 A1 | 1/2011 | Metreaud | |
| 2012/0263215 A1 | 10/2012 | Peng | |
| 2013/0259153 A1* | 10/2013 | Varanese | H04L 1/0001 |
| | | | 375/295 |
| 2014/0098908 A1* | 4/2014 | Rangachari | H04L 25/061 |
| | | | 375/319 |
| 2014/0270002 A1* | 9/2014 | Schubert | H04L 1/0045 |
| | | | 375/320 |
| 2014/0273902 A1 | 9/2014 | An | |

OTHER PUBLICATIONS

Hai Lin; Katsumi Yamashita, Time Domain Blind I/Q Imbalance Compensation Based on Real-Valued Filter, Oct. 2, 2012, pp. 4342-4350, vol. 11 Issue 12, IEEE.

Lauri Anttila; Mikko Valkama, Blind Signal Estimation in Widely-Linear Signal Models With Fourth-Order Circularity: Algorithms and Application to Receiver I/Q Calibration, Nov. 29, 2012, pp. 221-224, vol. 20, Issue 3, IEEE.

Zhiwen Zhu; Xinping Huang; Henry Leung, Blind Compensation of Frequency-Dependent I/Q Imbalance in Direct Conversion OFDM Receivers, Feb. 2, 2013, pp. 297-300, vol. 17, Issue 2, IEEE.

Balachander Narasmihan; Charles Chien; Sheng-Hong Yan, Robust low-complexity blind frequency-dependent I/Q estimation and compensation, Dec. 9, 2013, pp. 4331-4336, IEEE, Atlanta, GA, USA.

* cited by examiner

CIRCUIT, METHOD, AND RECEIVER APPARATUS FOR PERFORMING ON-THE-FLY IQ MISMATCH COMPENSATION

CROSS REFERENCE TO RELATED APPLICATIONS

This application claims priority of U.S. provisional application Ser. No. 62/462,406 filed on Feb. 23, 2017, which is entirely incorporated herein by reference.

BACKGROUND

The invention relates to an on-the-fly calibration mechanism, and more particularly to a circuit, method, and receiver apparatus for performing on-the-fly IQ mismatch compensation (or IRR compensation) when receiver apparatus is operating under a data reception mode.

Generally speaking, a higher-order QAM (Quadrature Amplitude Modulation) communication system may specify a higher signal-to-noise ratio (SNR) requirement. That is, a higher image rejection ratio (IRR) is needed. However, IQ (in-phase and quadrature-phase) mismatches such as gain mismatch or phase mismatch caused by circuit impairments due to manufacturing process, temperature change, or other conditions/factors would inevitably cause IRR degradation.

A conventional solution is to use the same test tone signal to test the analog receiver circuits and then apply digital IRR compensation. Unfortunately, such conventional solution merely compensates fixed IQ mismatches and cannot compensate IQ mismatches caused by temperature change/drift.

Further, other conventional solutions may be provided to alter the circuit structure of analog receiver circuits by doubling the sampling rate or adjusting the phases of IQ mixers as the same phase to compensate IQ mismatches as far as possible. However, these solutions consume more power, and the analog receiver circuits cannot receive symbol signals when the compensation of IQ mismatches is being performed since a local oscillator is needed to be reconfigured and/or the phase difference of IQ mixers is needed to be 90 degrees when the analog receiver circuits receive symbol signals.

SUMMARY

Therefore one of the objectives of the invention is to provide a circuit, method, and receiver apparatus for performing on-the-fly IQ mismatch compensation (or IRR compensation) when receiver apparatus is operating under a data reception mode, to solve the above-mentioned problems.

According to embodiments of the invention, a circuit included within a receiver apparatus and configured for performing IQ mismatch compensation when the receiver apparatus is operating under a data reception mode is disclosed. The circuit is coupled to a radio frequency (RF) receiver which is configured for receiving a radio frequency signal under the data reception mode to generate a data signal. The circuit comprises a transform circuit and a calibration circuit. The transform circuit is configured for transforming the data signal from time domain into a plurality of frequency bin signals in frequency domain. The calibration circuit is coupled to the transform circuit and configured for calculating to obtain at least one frequency domain calibration parameter according to the plurality of frequency bin signals in frequency domain, and updating at least one coefficient parameter of an IQ mismatch compensator according to the obtained at least one frequency domain calibration parameter, to make the IQ mismatch compensator compensate IQ mismatch based on the updated at least one coefficient parameter.

According to the embodiments, a method employed by a circuit included within a receiver apparatus and configured for performing IQ mismatch compensation when the receiver apparatus is operating under a data reception mode is disclosed. The circuit is coupled to a radio frequency receiver which is configured for receiving a radio frequency signal under the data reception mode to generate a data signal. The method comprises: transforming the data signal from time domain into a plurality of frequency bin signals in frequency domain; calculating to obtain at least one frequency domain calibration parameter according to the plurality of frequency bin signals in frequency domain; and, updating at least one coefficient parameter of IQ mismatch compensation according to the obtained at least one frequency domain calibration parameter, to make the IQ mismatch compensation compensate IQ mismatch based on the updated at least one coefficient parameter.

According to the embodiments, a receiver apparatus is disclosed. The receiver apparatus comprises a radio frequency receiver and a circuit. The radio frequency receiver is configured for receiving a radio frequency signal under a data reception mode to generate a data signal. The circuit is coupled to the radio frequency receiver and configured for performing IQ mismatch compensation when the receiver apparatus is operating under the data reception mode. The circuit comprises the transform circuit and the calibration circuit mentioned above.

According to the embodiments, the on-the-fly IQ mismatch compensation/calibration would not interrupt data symbol transmission or reception, and the performance of a communication system can be significantly improved. In addition, the on-the-fly IQ mismatch compensation/calibration calculates calibration parameter(s) in frequency domain by classifying frequency bin signals into different groups, and thus can effectively compensate or calibrate frequency dependent IQ mismatch including gain mismatch and phase mismatch. Also, the on-the-fly IQ mismatch compensation/calibration can effectively compensate or calibrate frequency independent IQ mismatch including gain mismatch and phase mismatch. In addition, compared to the conventional solutions, the on-the-fly IQ mismatch compensation/calibration does not add other circuits into analog RF receiver circuits. That is, this does not increase RF circuit costs. In addition, the on-the-fly IQ mismatch compensation/calibration can provide a theoretically optimal solution which is robust against a large class of random RF signals, and the performance is not degraded due to uncertain approximation errors.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
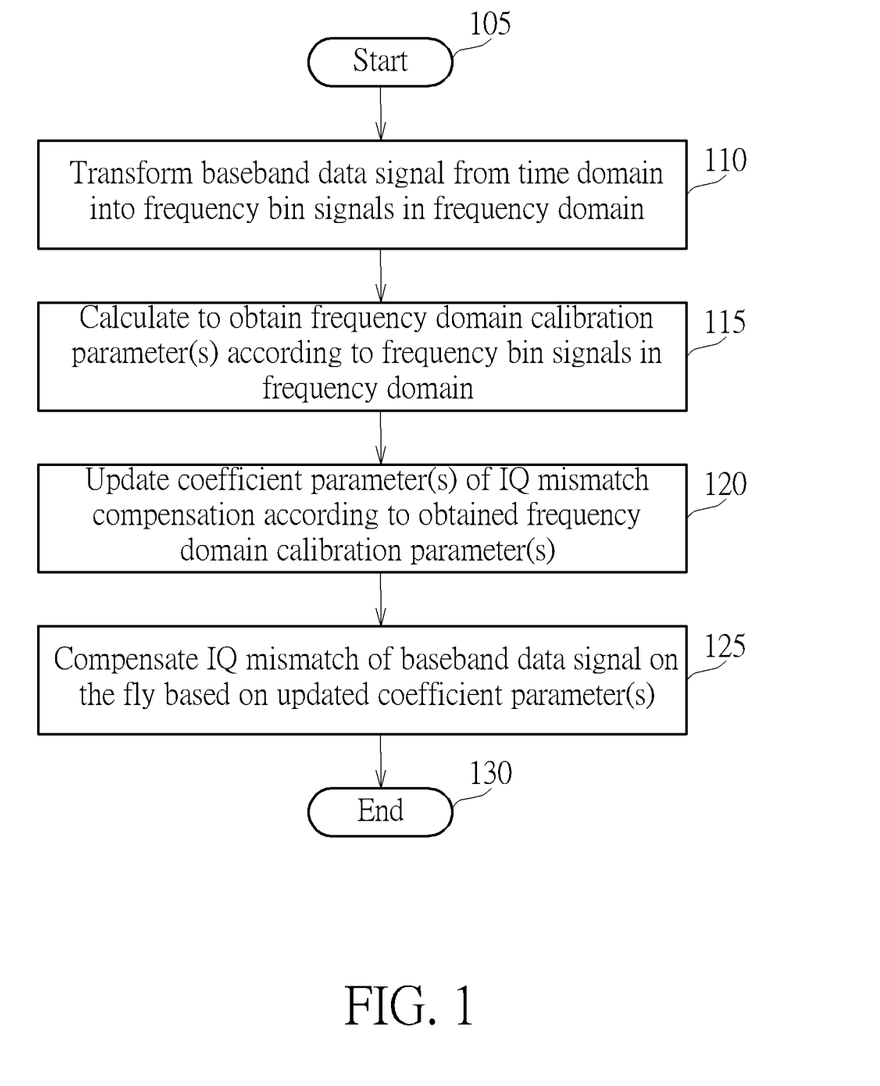
FIG. 1 is a diagram illustrating a flowchart of a method capable of performing on-the-fly IQ (in-phase and quadrature-phase) mismatch/imbalance compensation/calibration when a receiver apparatus is operating under a data reception mode according to embodiments of the invention.

FIG. 1 is a diagram illustrating a flowchart of a method capable of performing on-the-fly IQ (in-phase and quadrature-phase) mismatch/imbalance compensation/calibration when a receiver apparatus is operating under a data reception mode according to embodiments of the invention. On-the-fly IQ mismatch compensation/calibration means that the method is capable of performing IQ mismatch estimation and compensation for the receiver apparatus while the receiver apparatus is operating under the data reception mode to receive data/signal. That is, the method is arranged to perform IQ mismatch estimation based on the received random data signals instead of known test signals which, when applied to the receiver apparatus, would interrupt data reception. The receiver apparatus for example is an OFDM receiver apparatus which can demodulate and decode a received QAM (quadrature amplitude modulation) or PSK (phase shifting keying) signal to obtain digital data based on multiple carrier frequencies in a wideband communication system; however, this is not intended to be a limitation. On-the-fly IQ mismatch compensation/calibration of such OFDM receiver apparatus is arranged to refer to information of previously received data symbol(s) of a digital data signal to compensate or calibrate IQ mismatch of an incoming or currently received data symbol of such digital data signal. It is not required to refer to a pilot signal or a prefix signal. In practice, the above-mentioned receiver apparatus comprises an analog receiving circuit such as a radio frequency receiver with direct-down conversion mechanism and a circuit such as a digital circuit coupled to the radio frequency receiver. The digital circuit for example is a baseband digital signal processing (DSP) circuit. The method is employed in the digital circuit to "on-the-fly" calibrate/compensate IQ mismatch of a data signal (e.g. baseband data signal) which is generated by the radio frequency receiver receiving a radio frequency signal under the data reception mode. Thus, the radio frequency receiver can be implemented by using a conventional type radio frequency receiver, and it is not required to modify the circuit structure of the analog receiving circuit when the method is employed in the digital circuit. Provided that substantially the same result is achieved, the steps of the flowchart shown in FIG. 1 need not be in the exact order shown and need not be contiguous, that is, other steps can be intermediate. Steps are detailed in the following:

Step 105: Start;

Step 110: transform the baseband data signal from time domain into a plurality of frequency bin signals in frequency domain;

Step 115: calculate to obtain at least one frequency domain calibration parameter according to the plurality of frequency bin signals in frequency domain;

Step 120: update at least one coefficient parameter of IQ mismatch compensation according to the obtained at least one frequency domain calibration parameter;

Step 125: use the IQ mismatch compensation to compensate IQ mismatch of the baseband data signal on the fly based on the updated at least one coefficient parameter; and Step 130: End.

Figure 2:
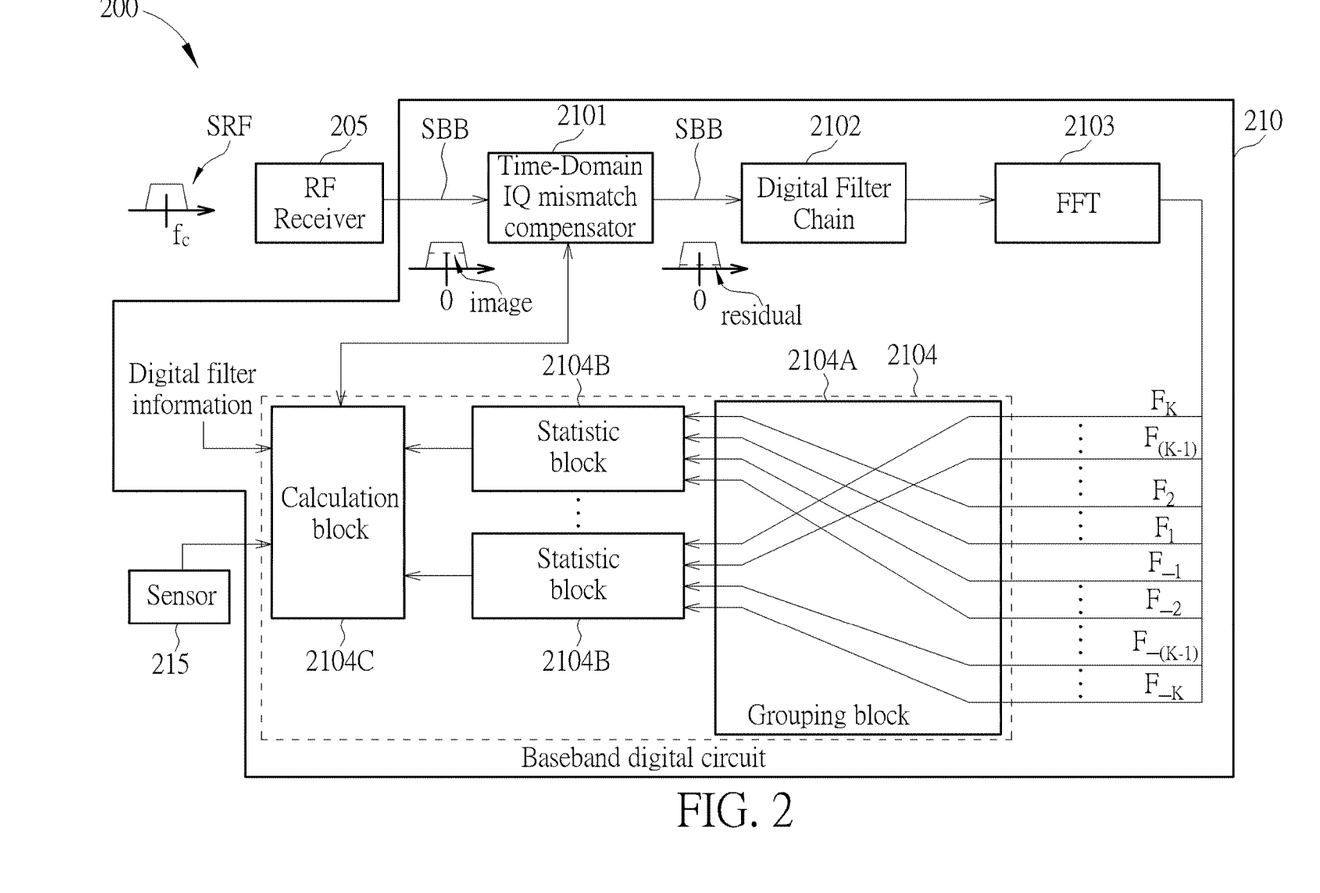
FIG. 2 is a block diagram showing an example of a receiver apparatus according to a first embodiment of FIG. 1.

FIG. 2 is a block diagram showing an example of a receiver apparatus 200 according to a first embodiment of FIG. 1. The receiver apparatus 200 comprises a radio frequency (RF) receiver circuit 205 and a digital circuit 210. The radio frequency receiver circuit 205 such as a radio frequency receiver with a direct-down conversion mechanism (but not limited) for receiving a radio frequency signal SRF (i.e. a modulation signal) to generate a baseband data signal SBB. The digital circuit 210 is coupled to the radio frequency receiver circuit 205 and comprises an IQ mismatch compensator 2101, a digital filter chain 2102, a transform circuit 2103 such as Fast Fourier Transform (FFT) circuit, and a calibration circuit 2104 (i.e. an on-the-fly IQ calibration circuit). The IQ mismatch compensator 2101 is arranged for performing the IQ mismatch compensation in time domain to process/calibrate/compensate the baseband data signal SBB according to at least one coefficient parameter of the compensator 2101. The at least one coefficient parameter can be previously generated and stored. The IQ mismatch compensator 2101 can effectively compensate/suppress an image signal occurring in the baseband data signal SBB based on the previously generated coefficient parameter(s) if a temperature condition or other conditions/factors are not changed/varied wherein the image signal indicates IQ mismatch of RF receiver 205. If the temperature condition or other conditions/factors are changed, an image residual signal may be generated at the output of IQ mismatch compensator 2101. In this situation, the above-mentioned on-the-fly IQ calibration is activated or triggered to adjust or update the coefficient parameter(s) of IQ mismatch compensator 2101 so as to make the compensator 2101 use the adjusted/updated coefficient parameter(s) to effectively compensate/suppress the image signal.

The digital filter chain 2102 is coupled to the output of IQ mismatch compensator 2101 and has a specific filter response function which is configured for performing a digital filter operation upon the baseband data signal SBB compensated by the compensator 2101. In addition, in other embodiment, the digital filter chain 2102 may comprise multiple different filter response functions such as two different filter response functions respectively for in-phase path and quadrature-phase path. Information of such digital filter chain 2102 is also referenced by the calibration circuit 2104 to calculate and update the coefficient parameter(s) of IQ mismatch compensator 2101. It should be noted that the digital filter chain 2102 is an optional circuit element; information of such digital filter chain 2102 is not referenced by the calibration circuit 2104 if the digital circuit 210 excludes the digital filter chain 2102.

The transform circuit 2103 (i.e. FFT circuit) is coupled to the output of digital filter chain 2102 and is configured for transforming the baseband data signal SBB from time domain into a plurality of frequency bin signals (i.e. subcarrier signals or tone signals) in frequency domain. The transform circuit 2103 can generate 2*K frequency bin signals wherein K is a positive integer. For example, the transform circuit 2103 can generate 2048 frequency bin signals which comprise 1024 positive frequency bin signals and 1024 corresponding negative frequency bin signals; this is not intended to be a limitation.

The calibration circuit 2104 is coupled to the output of transform circuit 2103 and is configured for calculating to obtain at least one frequency domain calibration parameter according to 2*K frequency bin signals in frequency domain, and updating at least one coefficient parameter of IQ mismatch compensator 2101 according to the obtained at least one frequency domain calibration parameter, to make the IQ mismatch compensator 2101 compensate IQ mismatch based on the updated at least one coefficient parameter on the fly.

To more clearly describe the operation of calibration circuit 2104, different functional blocks of calibration circuit 2104 are shown on FIG. 2. The calibration circuit 2104 is arranged for perform/execute the grouping block 2104A to classify 2*K frequency bin signals into a plurality of frequency bin groups such as L groups wherein L is a positive integer smaller than or equal to K. In the embodiment, a positive frequency bin signal such as $F_K$ and a corresponding negative frequency bin signal such as $F_{-K}$ can be regarded as one set of frequency bin signals. That is, a positive frequency bin signal $F_{K-1}$ and a corresponding negative frequency bin signal such as $F_{-(K-1)}$ are another set of frequency bin signals. The calibration circuit 2104 is arranged to classify one set of frequency bin signals or multiple neighboring sets of frequency bin signals into one group. For example, the calibration circuit 2104 can classify one set of frequency bin signals ($F_K$ and $F_{-K}$) into one frequency bin group. Alternatively, in this embodiment, the calibration circuit 2104 classifies two sets of frequency bin signals ($F_K$, $F_{-K}$, $F_{K-1}$, $F_{-(K-1)}$) into one frequency bin group; similarly, the calibration circuit 2104 classifies two sets of frequency bin signals ($F_1$, $F_{-1}$, $F_2$, $F_{-2}$) into another frequency bin group, as shown in FIG. 2. That is, each frequency bin group may comprise at least one set of frequency bin signals or multiple sets of frequency bin signals. Neighboring sets of frequency bin signals mean neighboring frequency bins (positive neighboring frequency bins and negative neighboring frequency bins) or frequency bins that have similar/same frequency-dependent characteristics (for example, $F_K$, $F_{-K}$, $F_1$, $F_{-1}$ may be classified into one frequency bin group if their frequency-dependent characteristics are the same or are similar). Then, the calibration circuit 2104 is arranged to perform/execute multiple statistic blocks 2104B (e.g. L blocks) to respectively perform linear transforms upon the plurality of frequency bin groups (i.e. L groups) to generate a plurality of groups of in-phase and quadrature-phase signals.

For example, for the OFDM communication system, an M-th symbol may comprise data of K positive subcarriers and K negative subcarriers. If R indicates data of K-th positive and negative subcarriers and a frequency bin group in this example is designed to have one pair/set of positive and negative subcarriers, then the calibration circuit 2104 is arranged to perform linear transform upon data $R_K$ and data $R_{-K}$ to generate data $R_I$ and data $R_Q$ wherein $R_K$ means data of K-th positive subcarrier, $R_{-K}$ means data of K-th negative subcarrier, $R_I$ means in-phase data of K-th positive and negative subcarriers, and $R_Q$ means quadrature-phase data of K-th positive and negative subcarriers. That is, data of $R_I$ and $R_Q$ is one group of in-phase and quadrature-phase signals in this example.

Then, the calibration circuit 2104 executes or performs the statistic blocks 2104B to respectively perform correlations upon different groups of in-phase and quadrature-phase signals to respectively compute or derive statistic data. For example, for the data $R_I$ and $R_Q$ (one group of in-phase and quadrature-phase signals corresponding to the K-th positive and negative subcarriers), the calibration circuit 2104 can calculate an absolute square value of data $R_I$, an absolute square value of data $R_Q$, and/or a product (multiplication result) of data $R_I$ and the conjugate of data $R_Q$. The calibration circuit 2104 can compute or derive a second-order correlation of each of the plurality of groups of in-phase and quadrature-phase signals to generate/obtain multiple second-order correlation results of the M-th symbol at a time slot.

The calibration circuit 2104 can generate/obtain multiple second-order correlation results of different symbols at multiple time slots. Based on the statistic data (correlation results) at multiple time slots, the calibration circuit 2104 is arranged to perform or execute the calculation block 2104C to derive at least one time-average (sample-average) frequency domain correlation result, and such time average frequency domain correlation result is used as frequency domain calibration parameter. The calibration circuit 2104 is arranged to convert the frequency domain calibration parameter(s) into time domain calibration parameter(s) and to update the coefficient parameter(s) of IQ mismatch compensator 2101 based on time domain calibration parameter(s). By doing so, the digital circuit 210 can calibrate or compensate the IQ mismatch residual of the baseband data signal SBB on-the-fly.

It should be noted that, in other embodiments, the calibration 2104 can compute or derive a higher order correlation of each of the plurality of groups of in-phase and quadrature-phase signals to generate the statistic data. For instance, the calibration circuit 2104 can compute or derive a fourth-order correlation of each of the plurality of groups of in-phase and quadrature-phase signals.

In addition, when updating the coefficient parameter(s) of IQ mismatch compensator 2101 based on time domain calibration parameter(s), the calibration circuit 2104 is arranged to further refer to the digital filter response of filter chain 2102.

In addition, time domain calibration parameter(s) generated by the calibration circuit 2104 is/are associated with residual IQ mismatch, and the calibration circuit 2104 is arranged to retrieve/obtain the coefficient parameter(s) from IQ mismatch compensator 2101, adding time domain calibration parameter(s) to the coefficient parameter(s), and finally to update the coefficient parameter(s) of IQ mismatch compensator 2101 based on the addition result(s).

In addition, the receiver apparatus 200 may further comprise a temperature sensor 215 which can be used for detecting or sensing the change of environmental temperature to determine whether to trigger the operation of calibration circuit 2104. For example, the temperature sensor 215 can be externally connected to the calibration circuit 2104 and can be arranged to periodically sense the environmental temperature. If the sensor 215 detects a big temperature change/variation, the calibration circuit 2104 can be triggered or activated by a control/trigger signal sent from the sensor 215 so that the receiver apparatus 200 can employ the calibration circuit 2104 to calibrate or compensate IQ mismatch caused by the temperature change on the fly. That is, in response to the temperature change, the receiver apparatus 200 can refer to previously received data symbol(s) of the baseband data signal mentioned above to compensate or calibrate IQ mismatch of an incoming data symbol of the baseband data signal. The receiver apparatus 200 can perform on-the-fly IQ compensation without referencing a pilot signal or a prefix signal. It should be noted that the above-described sensor 215 is an optional circuit element; the calibration circuit 2104 can be arranged to periodically perform on-the-fly IQ calibration/compensation.

In addition, the calibration circuit 2104 performs/executes the grouping block 2104A to classify frequency bin signals into frequency bin groups so as to compute the statistic data (correlation results) of different frequency bin groups for updating the coefficient parameter(s) of IQ mismatch compensator 2101. This method can effectively calibrate, compensate, or suppress IQ mismatch residuals caused by frequency dependent IQ mismatch including gain mismatch and phase mismatch. Also, this method can effectively calibrate, compensate, or suppress IQ mismatch residuals caused by frequency independent IQ mismatch including gain mismatch and phase mismatch.

Figure 3:
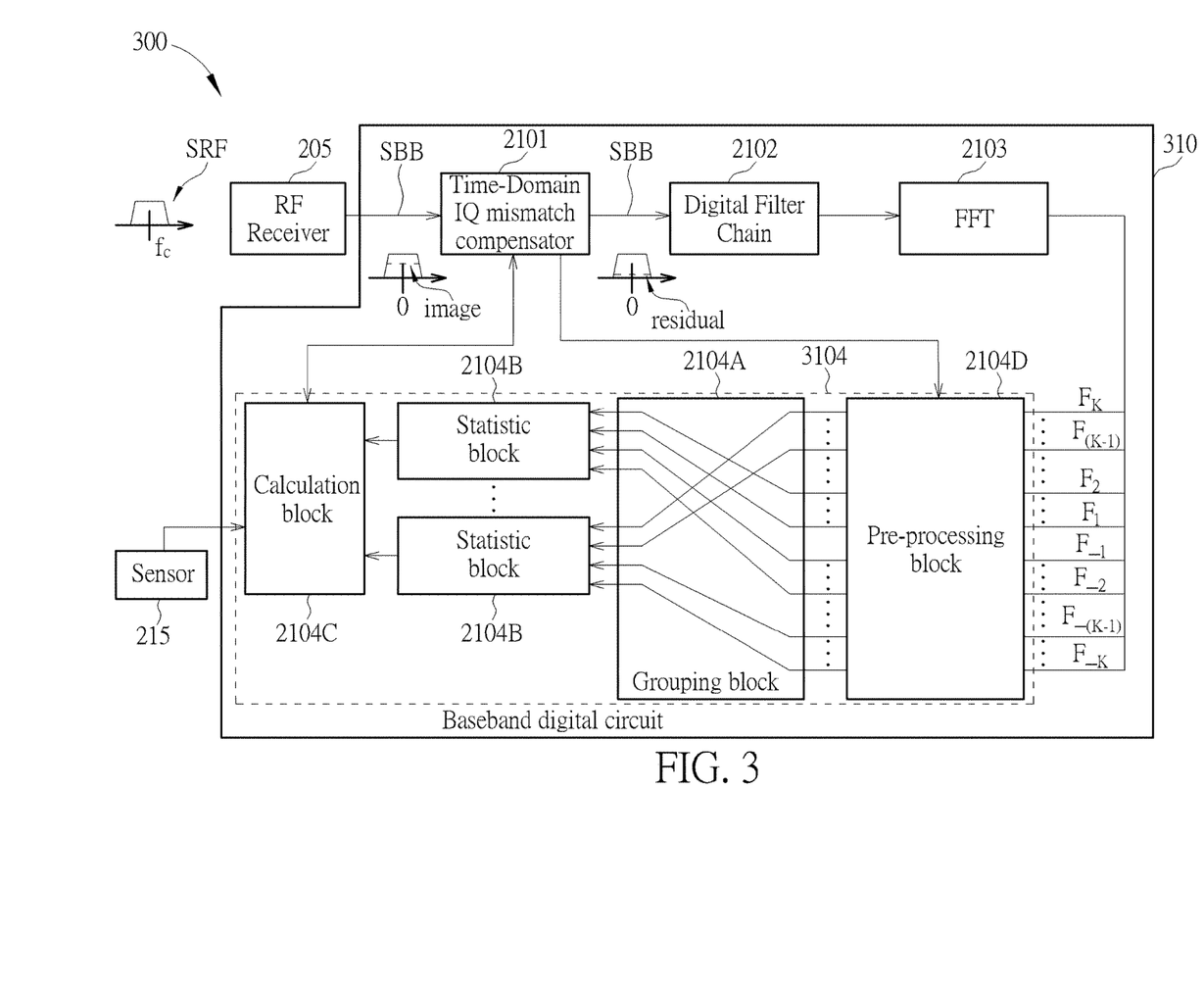
FIG. 3 is a block diagram showing an example of a receiver apparatus according to a second embodiment of FIG. 1.

Further, in another embodiment, the above-mentioned calibration circuit can further comprise pre-processing block to reduce computation complexity. FIG. 3 is a block diagram of a receiver apparatus 300 according to a second embodiment of FIG. 1. The receiver apparatus 300 comprises the RF receiver circuit 205 mentioned above and a digital circuit 310. The digital circuit 310 comprises the time-domain IQ mismatch compensator 2101, the digital filter chain 2102, FFT circuit 2103, and a calibration circuit 3104. The calibration circuit 3104 comprises a pre-processing block 2104D, the grouping block 2104A, statistic blocks 2104B, and the calculation block 2104C. The pre-processing block 2104D is arranged to receive the output of transform circuit 2103 to remove the frequency independent compensation from the output of transform circuit 2103 according to the coefficient parameter(s) of IQ mismatch compensator 2101. That is, the pre-processing block 2104D is arranged to use the coefficient parameter(s) of IQ mismatch compensator 2101 to respectively remove the mismatch compensation made to the K frequency bin signals of transform circuit 2103 in frequency domain before the K frequency bin signals are classified into different L frequency bin groups. In addition, the pre-processing block 2104D is arranged to refer to digital filter information (filter response function(s) of digital filter chain 2102) to respectively adjust the K frequency bin signals. The pre-processing block 2104D is used for reducing the computation complexity of the following blocks 2104A-2104C.

In addition, the above-mentioned compensator or blocks can be implemented by hardware circuits, software modules/application/programs, and/or any combinations of hardware circuits and software modules/application/programs.

Figure 4:
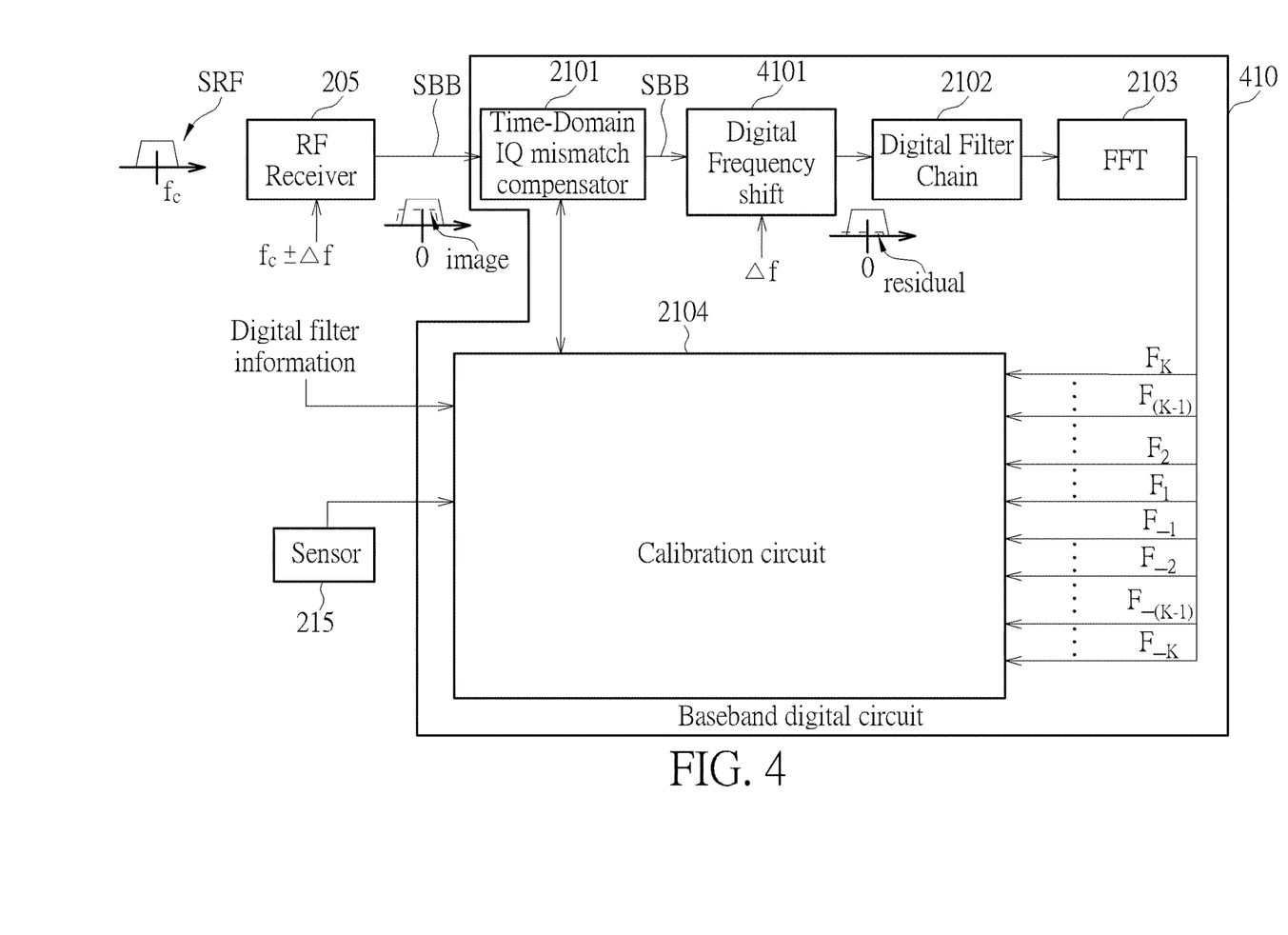
FIG. 4 is a block diagram showing an example of a receiver apparatus according to a third embodiment of FIG. 1.

Further, in other embodiments, the above-mentioned digital circuit may comprise a digital frequency shift circuit. FIG. 4 is a block diagram of a receiver apparatus 400 according to a third embodiment of FIG. 1. The receiver apparatus 400 comprises the RF receiver circuit 205 mentioned above and a digital circuit 410. The digital circuit 410 comprises the time-domain IQ mismatch compensator 2101, a digital frequency shift circuit 4101, the digital filter chain 2102, FFT circuit 2103, and the calibration circuit 2104. The digital frequency shift circuit 4101 is disposed and coupled between the time-domain IQ mismatch compensator 2101 and the digital filter chain 2102. The digital frequency shift circuit 4101 is configured for performing a digital frequency shift operation upon the baseband data signal SBB to shift a frequency of the baseband data signal SBB according to a frequency shift $\Delta f$ which is a small frequency shift. In response to the design of digital frequency shift circuit 4101, the RF receiver circuit 205 is arranged to receive the modulation signal modulated by carrier frequencies $f_c$ with the frequency shift $\Delta f$. This design can improve the performance of on-the-fly IQ mismatch compensation.

Figure 5:
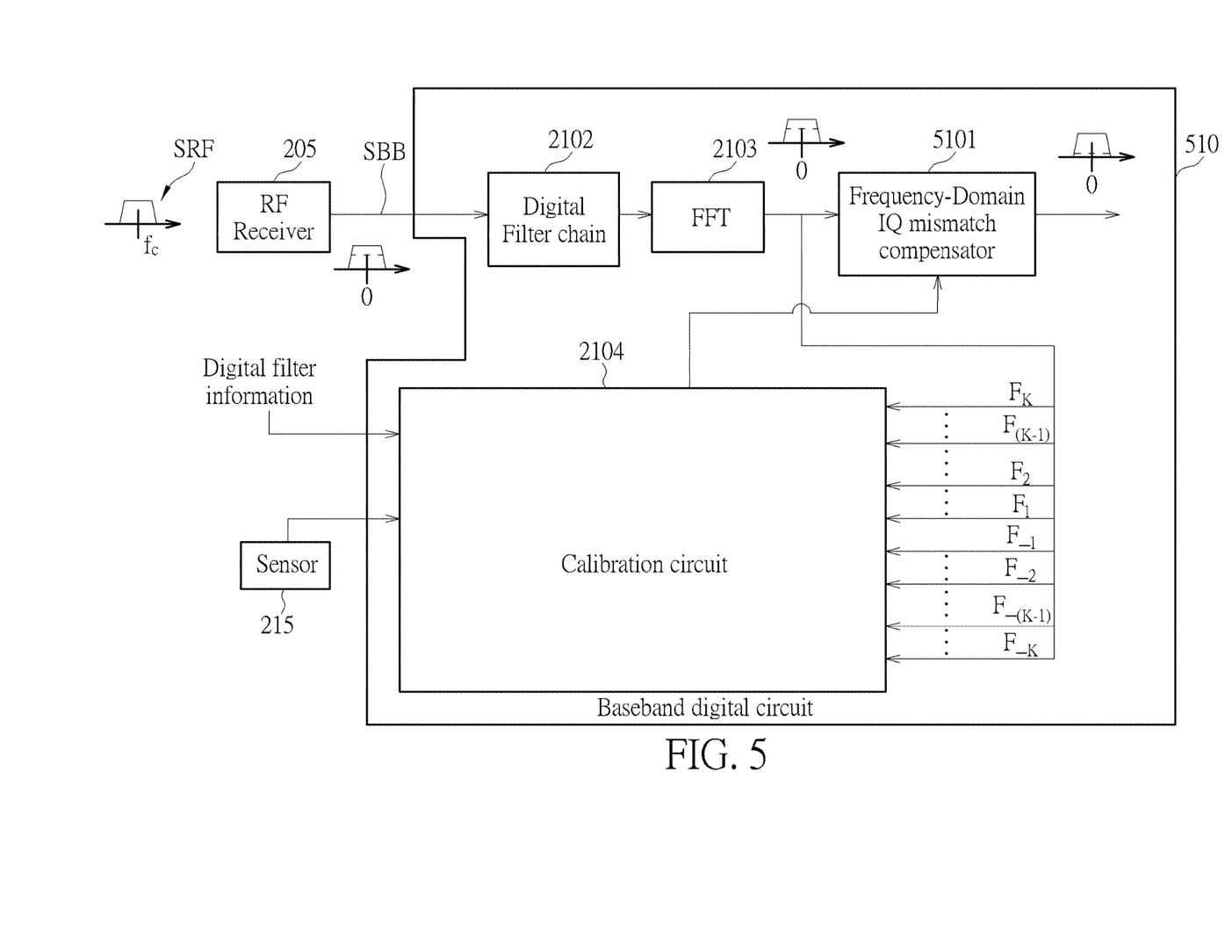
FIG. 5 is a block diagram showing an example of a receiver apparatus according to a fourth embodiment of FIG. 1.

Further, in other embodiments, the IQ mismatch compensation of a compensator can be performed in the frequency domain. FIG. 5 is a block diagram of a receiver apparatus 500 according to a fourth embodiment of FIG. 1. The receiver apparatus 500 comprises the RF receiver circuit 205 mentioned above and a digital circuit 510. The digital circuit 510 comprises the digital filter chain 2102, FFT circuit 2103, the calibration circuit 2104, and a frequency-domain IQ mismatch compensator 5101. The frequency-domain IQ mismatch compensator 5101 is couple to the output of transform circuit (FFT circuit) 2103 and arranged to perform IQ mismatch compensation upon the frequency bin signals of FFT circuit 2103 based on coefficient parameter(s) determined or updated by the calibration circuit 2104. The operation and function of calibration circuit 2104 in FIG. 5 is similar to those of calibration circuit 2104 in FIG. 2. The difference is that the calibration circuit 2104 of FIG. 5 is arranged to use frequency domain calibration parameter(s) to determine or update the coefficient parameter(s) of frequency-domain IQ mismatch compensator 5101 when the frequency domain calibration parameter(s) has/have been calculated/computed.

As mentioned above, the on-the-fly IQ mismatch compensation/calibration method does not require interrupting data symbol transmission or reception, and the performance of the communication system can be significantly improved. In addition, the on-the-fly IQ mismatch compensation/calibration method calculates calibration parameter(s) in frequency domain by classifying frequency bin signals into different groups, and thus can effectively compensate or calibrate frequency dependent IQ mismatch including gain mismatch and phase mismatch. Also, the on-the-fly IQ mismatch compensation/calibration method can effectively compensate or calibrate frequency independent IQ mismatch including gain mismatch and phase mismatch. In addition, compared to the conventional solutions, the on-the-fly IQ mismatch compensation/calibration method does not add other circuits into analog RF receiver circuits. That is, this does not increase RF circuit costs. In addition, the on-the-fly IQ mismatch compensation/calibration method can provide a theoretically optimal solution which is robust against a large class of random RF signals, and the performance is not degraded due to uncertain approximation errors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit included within a receiver apparatus and configured for performing IQ mismatch compensation when the receiver apparatus is operating under a data reception mode, the circuit being coupled to a radio frequency receiver which is configured for receiving a radio frequency signal under the data reception mode to generate a data signal, and the circuit comprises:

a transform circuit, configured for transforming the data signal from time domain into a plurality of frequency bin signals in frequency domain; and a calibration circuit, coupled to the transform circuit, configured for calculating to obtain at least one frequency domain calibration parameter according to the plurality of frequency bin signals in frequency domain, and updating at least one coefficient parameter of an IQ mismatch compensator coupled to the transform circuit according to the obtained at least one frequency domain calibration parameter, to make the IQ mismatch compensator compensate IQ mismatch based on the updated at least one coefficient parameter, wherein the calibration circuit is arranged for:

classifying the plurality of frequency bin signals into a plurality of frequency bin groups, each frequency bin group comprising at least one pair of frequency bin signal with corresponding positive and negative frequency bins;

respectively performing linear transform upon the plurality of frequency bin groups to generate a plurality of groups of in-phase and quadrature-phase signals; and respectively performing a correlation operation upon the plurality of groups of in-phase and quadrature-phase signals to calculate at least one time average frequency domain correlation result as the at least one frequency domain calibration parameter.

2. The circuit of claim 1, further comprising:

the IQ mismatch compensator, coupled between the radio frequency receiver and the transform circuit, configured for performing the IQ mismatch compensation in time domain to process the data signal according to the at least one coefficient parameter before the transform circuit transforms the data signal from time domain into the plurality of frequency bin signals in frequency domain;

wherein the calibration circuit is further arranged for converting the obtained at least one frequency domain calibration parameter into at least one time domain calibration parameter, and for updating the at least one coefficient parameter of the IQ mismatch compensation by referring to the obtained at least one time domain calibration parameter.

3. The circuit of claim 1, wherein the calibration circuit is further arranged for classifying a set of frequency bin signals in the plurality of frequency bin signals into an identical frequency bin group, and the set of frequency bin signals has identical or similar frequency-dependent characteristics.

4. The circuit of claim 1, wherein the calibration circuit is further arranged for:

performing the correlation operation upon the plurality of groups of in-phase and quadrature-phase signals by deriving a second-order correlation of the plurality of groups of in-phase and quadrature-phase signals at multiple time slots to generate the at least one time average frequency domain correlation result.

5. The circuit of claim 1, wherein the calibration circuit is further arranged for:

performing the correlation operation upon the plurality of groups of in-phase and quadrature-phase signals by deriving a fourth-order correlation of the plurality of groups of in-phase and quadrature-phase signals at multiple time slots to generate the at least one time average frequency domain correlation result.

6. The circuit of claim 1, wherein the calibration circuit is further arranged for obtaining the at least one coefficient parameter of the IQ mismatch compensator and removing frequency-independent compensation from the plurality of frequency bin signals according to the obtained at least one coefficient parameter of the IQ mismatch compensator before classifying the plurality of frequency bin signals into the plurality of frequency bin groups.

7. The circuit of claim 1, further comprises:

a digital frequency shift circuit, coupled between the IQ mismatch compensator and the transform circuit, configured for performing a digital frequency shift operation upon the data signal to shift a frequency of the data signal according to a frequency shift;

wherein the radio frequency receiver is arranged for receiving a signal modulated by a carrier frequency according to the carrier frequency with the frequency shift.

8. The circuit of claim 1, further comprises:

a digital filter chain, coupled between the IQ mismatch compensator and the transform circuit, the digital filter chain having a specific filter response function configured for performing digital filtering operation upon the data signal;

wherein the calibration circuit is further arranged for calculating the at least one frequency domain calibration parameter according to the specific filter response function and the plurality of frequency bin signals in frequency domain.

9. The circuit of claim 1, wherein the calibration circuit is triggered by a temperature change detected by an external temperature sensor.

10. A method employed by a circuit included within a receiver apparatus and configured for performing IQ mismatch compensation when the receiver apparatus is operating under a data reception mode, the circuit being coupled to a radio frequency receiver which is configured for receiving a radio frequency signal under the data reception mode to generate a data signal, and the method comprises:

transforming the data signal from time domain into a plurality of frequency bin signals in frequency domain;

calculating to obtain at least one frequency domain calibration parameter according to the plurality of frequency bin signals in frequency domain; and updating at least one coefficient parameter of the IQ mismatch compensation according to the obtained at least one frequency domain calibration parameter, to make the IQ mismatch compensation compensate IQ mismatch based on the updated at least one coefficient parameter, wherein the step of calculating to obtain the at least one frequency domain calibration parameter comprises:

classifying the plurality of frequency bin signals into a plurality of frequency bin groups, each frequency bin group comprising at least one pair of frequency bin signal with corresponding positive and negative frequency bins;

respectively performing linear transform upon the plurality of frequency bin groups to generate a plurality of groups of in-phase and quadrature-phase signals; and respectively performing a correlation operation upon the plurality of groups of in-phase and quadrature-phase signals to calculate at least one time average frequency domain correlation result as the at least one frequency domain calibration parameter.

11. The method of claim 10, further comprising:

before transforming the data signal from time domain into the plurality of frequency bin signals in frequency domain:

performing the IQ mismatch compensation in time domain to process the data signal according to the at least one coefficient parameter; and the step of updating the at least one coefficient parameter of the IQ mismatch compensation according to the obtained at least one frequency domain calibration parameter comprises:

converting the obtained at least one frequency domain calibration parameter into at least one time domain calibration parameter; and updating the at least one coefficient parameter of the IQ mismatch compensation by referring to the obtained at least one time domain calibration parameter.

12. The method of claim 10, wherein the classifying step comprises:
classifying a set of frequency bin signals in the plurality of frequency bin signals into an identical frequency bin group, the set of frequency bin signals having identical or similar frequency-dependent characteristics.

13. The method of claim 10, wherein the step of performing the correlation operation comprises:
performing the correlation operation upon the plurality of groups of in-phase and quadrature-phase signals by deriving a second-order correlation of the plurality of groups of in-phase and quadrature-phase signals at multiple time slots to generate the at least one time average frequency domain correlation result.

14. The method of claim 10, wherein the step of performing the correlation operation comprises:
performing the correlation operation upon the plurality of groups of in-phase and quadrature-phase signals by deriving a fourth-order correlation of the plurality of groups of in-phase and quadrature-phase signals at multiple time slots to generate the at least one time average frequency domain correlation result.

15. The method of claim 10, wherein the step of calculating to obtain the at least one frequency domain calibration parameter comprises:
before classifying the plurality of frequency bin signals into the plurality of frequency bin groups:
obtaining the at least one coefficient parameter of the IQ mismatch compensation; and
removing frequency-independent compensation from the plurality of frequency bin signals according to the obtained at least one coefficient parameter of the IQ mismatch compensation.

16. The method of claim 10, further comprising:
before transforming the data signal from time domain into the plurality of frequency bin signals in frequency domain:
performing a frequency shift operation upon the data signal to shift a frequency of the data signal according to a frequency shift, wherein the radio frequency receiver receives a signal modulated by a carrier frequency according to the carrier frequency with the frequency shift.

17. The method of claim 10, further comprising:
before transforming the data signal from time domain into the plurality of frequency bin signals in frequency domain:
using a digital filter chain having a specific filter response function to perform a digital filtering operation upon the data signal; and
the step of calculating to obtain the at least one frequency domain calibration parameter according to the plurality of frequency bin signals in frequency domain comprises:
calculating to obtain the at least one frequency domain calibration parameter according to the specific filter response function and the plurality of frequency bin signals in frequency domain.

18. The method of claim 10, further comprising:
before calculating to obtain the at least one frequency domain calibration parameter according to the plurality of frequency bin signals in frequency domain:
using a temperature sensor to detect a temperature change to trigger the step of calculating to obtain the at least one frequency domain calibration parameter.

19. The method of claim 10, wherein the step of updating the at least one coefficient parameter of the IQ mismatch compensation according to the obtained at least one frequency domain calibration parameter comprises:
updating the at least one coefficient parameter of the IQ mismatch compensation in frequency domain according to the obtained at least one frequency domain calibration parameter, to make the IQ mismatch compensation compensate the IQ mismatch in frequency domain based on the updated at least one coefficient parameter.

20. A receiver apparatus, comprising:
a radio frequency receiver, configured for receiving a radio frequency signal under a data reception mode to generate a data signal; and
a circuit, coupled to the radio frequency receiver, configured for performing IQ mismatch compensation when the receiver apparatus is operating under the data reception mode, and the circuit comprises:
a transform circuit, configured for transforming the data signal from time domain into a plurality of frequency bin signals in frequency domain; and
a calibration circuit, coupled to the transform circuit, configured for calculating to obtain at least one frequency domain calibration parameter according to the plurality of frequency bin signals in frequency domain, and updating at least one coefficient parameter of an IQ mismatch compensator coupled to the transform circuit according to the obtained at least one frequency domain calibration parameter, to make the IQ mismatch compensator compensate IQ mismatch based on the updated at least one coefficient parameter, wherein the calibration circuit is arranged for:
classifying the plurality of frequency bin signals into a plurality of frequency bin groups, each frequency bin group comprising at least one pair of frequency bin signal with corresponding positive and negative frequency bins;
respectively performing linear transform upon the plurality of frequency bin groups to generate a plurality of groups of in-phase and quadrature-phase signals; and
respectively performing a correlation operation upon the plurality of groups of in-phase and quadrature-phase signals to calculate at least one time average frequency domain correlation result as the at least one frequency domain calibration parameter.

* * * * *

UNITED STATES PATENT AND TRADEMARK OFFICE
CERTIFICATE OF CORRECTION

PATENT NO. : 10,277,450 B2
APPLICATION NO. : 15/716527
DATED : April 30, 2019
INVENTOR(S) : Wei-Chiang Li et al.

Page 1 of 1

It is certified that error appears in the above-identified patent and that said Letters Patent is hereby corrected as shown below:

On the Title Page

Item (72), correct the address (city) of the 2nd inventor from "Hsinchi County (TW)" to --Hsinchu County (TW)--.

Signed and Sealed this
Thirteenth Day of August, 2019

Andrei Iancu
*Director of the United States Patent and Trademark Office*